United States Patent
Kamm

(10) Patent No.: US 7,891,483 B2
(45) Date of Patent: Feb. 22, 2011

(54) DEVICE FOR TREATING FOODSTUFFS WITH A CONVEYOR BELT FOR CONVEYING FOODSTUFFS THROUGH A TREATMENT ZONE

(75) Inventor: Volker Kamm, Oberschleissheim (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 11/110,769

(22) Filed: Apr. 21, 2005

(65) Prior Publication Data
US 2005/0241332 A1    Nov. 3, 2005

(30) Foreign Application Priority Data
Apr. 22, 2004   (DE) ................. 10 2004 020 195

(51) Int. Cl.
| B65G 15/60 | (2006.01) |
| B65G 17/00 | (2006.01) |
| B65G 21/20 | (2006.01) |
| B65G 39/10 | (2006.01) |
| B65G 21/10 | (2006.01) |
| B65G 41/00 | (2006.01) |

(52) U.S. Cl. ............... 198/841; 198/840; 198/860.2
(58) Field of Classification Search ............ 198/841, 198/861.1, 837, 844.1, 840, 860.2
See application file for complete search history.

(56) References Cited

U.S. PATENT DOCUMENTS

| 3,938,350 | A   |   | 2/1976  | Martin et al. |
| 3,976,192 | A   | * | 8/1976  | Muller ................. 198/835 |
| 4,989,723 | A   | * | 2/1991  | Bode et al. ............ 198/635 |
| 5,295,570 | A   | * | 3/1994  | Grecksch et al. ...... 198/465.1 |
| 5,305,808 | A   | * | 4/1994  | Rasmussen et al. .... 141/169 |
| 5,346,053 | A   | * | 9/1994  | Dorn .................... 198/399 |
| 6,003,662 | A   | * | 12/1999 | McCaffrey et al. .... 198/836.3 |
| 6,269,939 | B1  | * | 8/2001  | Lapeyre et al. ........ 198/615 |
| 6,523,679 | B1  | * | 2/2003  | Manchester .......... 198/841 |
| 6,533,110 | B1  | * | 3/2003  | Ledingham .......... 198/861.1 |

FOREIGN PATENT DOCUMENTS

EP      0 479 516 A1     4/1992

\* cited by examiner

Primary Examiner—Gene Crawford
Assistant Examiner—Ramya Prakasam
(74) Attorney, Agent, or Firm—Crowell & Moring LLP

(57) ABSTRACT

A device for treating foodstuffs, in which the foodstuffs are conveyed by a conveyor belt through a treatment zone, such as tunnel freezers for freezing foodstuffs. The conveyor belt is supported by a frame on which sliding rails are mounted to reduce friction. The conveyor belt is guided over these sliding rails. To prevent hygiene problems such as those occurring due to gaps formed when the sliding rails are mounted on the carrier, the sliding rails are designed as self-supporting elements. The sliding rails here are preferably simply placed on the transverse bars of the supporting frame.

6 Claims, 3 Drawing Sheets

PRIOR ART

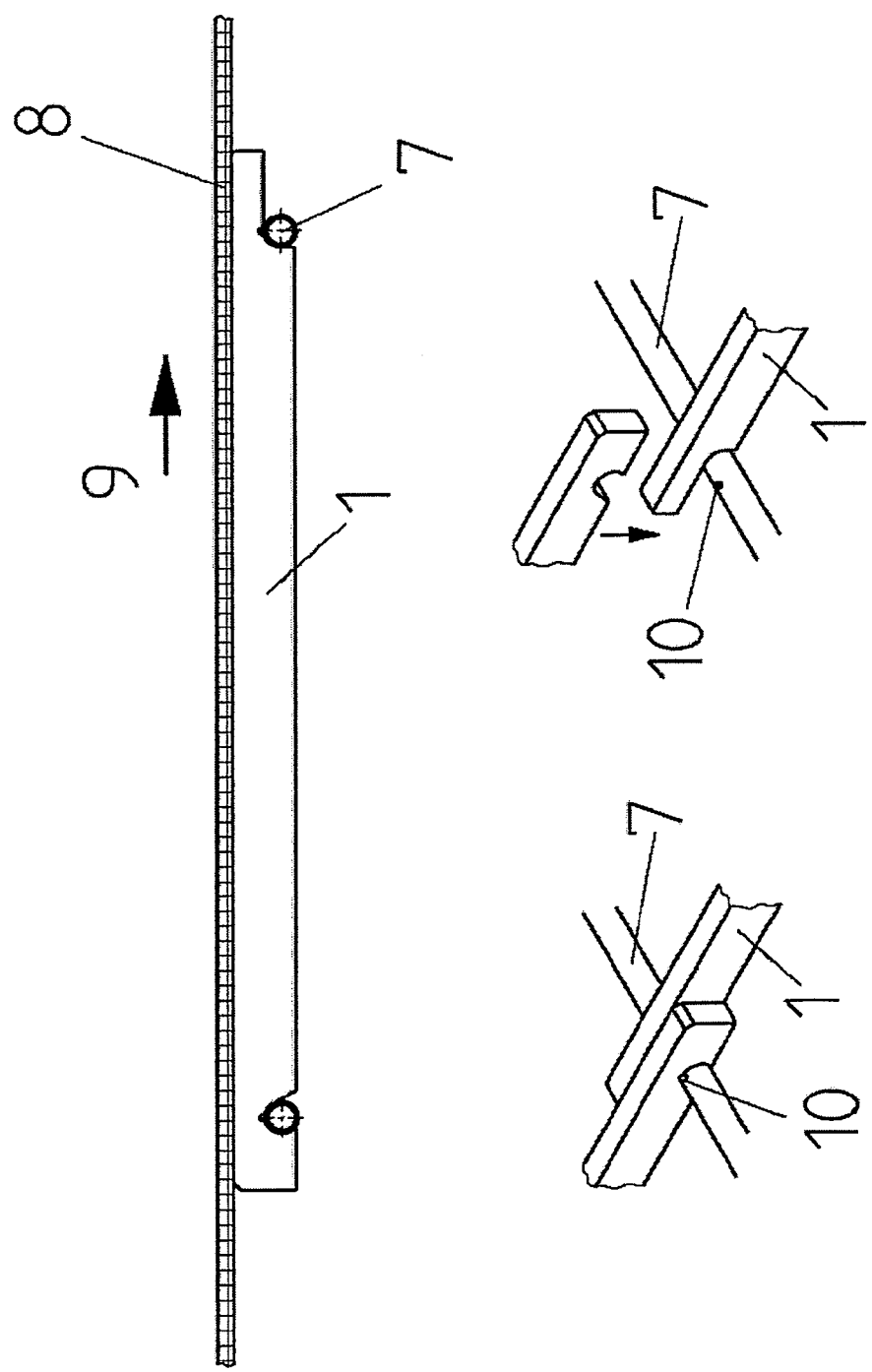

DEVICE FOR TREATING FOODSTUFFS WITH A CONVEYOR BELT FOR CONVEYING FOODSTUFFS THROUGH A TREATMENT ZONE

This application claims the priority of German Application No. 102004020195.1, filed Apr. 22, 2004, the disclosure of which is expressly incorporated by reference herein.

BACKGROUND AND SUMMARY OF THE INVENTION

This invention relates to a device for treating foodstuffs, comprising a treatment zone in which a conveyor belt for conveying the foodstuffs through the treatment zone is situated, whereby the conveyor belt is supported by a framework, and sliding rails over which the conveyor belt is guided are mounted on the framework.

For treatment of foodstuffs, in particular for refrigeration and/or freezing of foodstuffs, equipment in which the foodstuffs are conveyed through a treatment zone, e.g., a refrigerated room, is often used. For example, so-called tunnel freezers are widely used; in such freezers, foodstuffs are conveyed through a housing designed like a tunnel in which a refrigerant, in particular a liquid gas such as liquid nitrogen, is sprayed onto the foodstuffs. A conveyor belt is generally used for conveying the foodstuffs through the tunnel freezer, with the foodstuffs moving continuously through the tunnel freezer on the conveyor belt, thereby being refrigerated and/or frozen. Such conveyor belts are usually between 200 mm and 2000 mm wide, for example. The conveyor belts are supported mechanically from beneath by the inherent weight of the belt and the weight of the foodstuffs on the conveyor belt being guided through the tunnel freezer. A framework of pipes and/or bars and/or sheet metal is used to support the belts. To minimize friction between the conveyor belt and the frame, sliding rails, e.g., made of plastic, with the conveyor belt guided on them are mounted on the frame along the direction of travel of the conveyor belt. The sliding rails are mounted on the frame; in previous embodiments, this has always resulted in a gap between the plastic sliding rails and the metal frame. In the past, U-shaped plastic sliding rails have generally been pushed onto a flat steel. However, the gaps that necessarily result constitute a hygiene problem in food technology. Food residues collecting in the gap spaces may lead to undesirable bacterial colonies.

The present invention is therefore based on the object of designing a device for treating foodstuffs such that even high hygiene requirements can be met.

This object is achieved according to this invention by designing the sliding rails as self-supporting elements.

Therefore, the sliding rails are no longer stuck onto flat steel irons, for example, but instead they form separate self-supporting elements. This makes it possible to minimize gaps that occur, e.g., when plastic comes in contact with metal. In addition, the time spent for installation, mounting and replacement of sliding rails is greatly reduced in comparison with the previously known technology.

The sliding rails are expediently made of a low-friction plastic and are mounted on the frame in a fixed and movable bearing construction to compensate for differences in thermal expansion.

According to an especially preferred embodiment of this invention, the sliding rails are simply placed on transverse bars. The sliding rails here expediently have recesses for the transverse bars. To prevent lateral slippage on the transverse bars, nipples are preferably provided on the transverse bars, securing the sliding rails laterally. Alternatively, the sliding rails may also be secured on the transverse bars by means of spacers to prevent lateral slippage. Bolts or sheet metal plates welded onto the transverse bars are also conceivable for lateral fixation.

The transverse bars may be designed as round sections, for example, but other sectional shapes adapted to special food freezers are also possible.

This invention is suitable for use with all conceivable equipment for treatment of foodstuffs in which the foodstuffs are conveyed on a conveyor belt through a treatment zone. This invention is particularly interesting for use with food freezers. The advantages achieved with this invention are manifested in particular in tunnel freezers.

The essential advantages of this invention include the fact that there are fewer gaps than with the technology known in the past, so the hygiene standard is definitely improved. Furthermore, the inventive solution offers simpler and faster assembly, easier replacement and less expensive repairs. Replacement and repair are possible without having to dismantle the conveyor belt. Fewer parts in general are needed on the belt supporting frame.

Other objects, advantages and novel features of the present invention will become apparent from the following detailed description of the invention when considered in conjunction with the accompanying drawings.

BRIEF DESCRIPTION OF THE DRAWING

FIG. 3 shows detailed views of the sliding rail assembly shown in FIG. 2.

DETAILED DESCRIPTION

Figure 1:
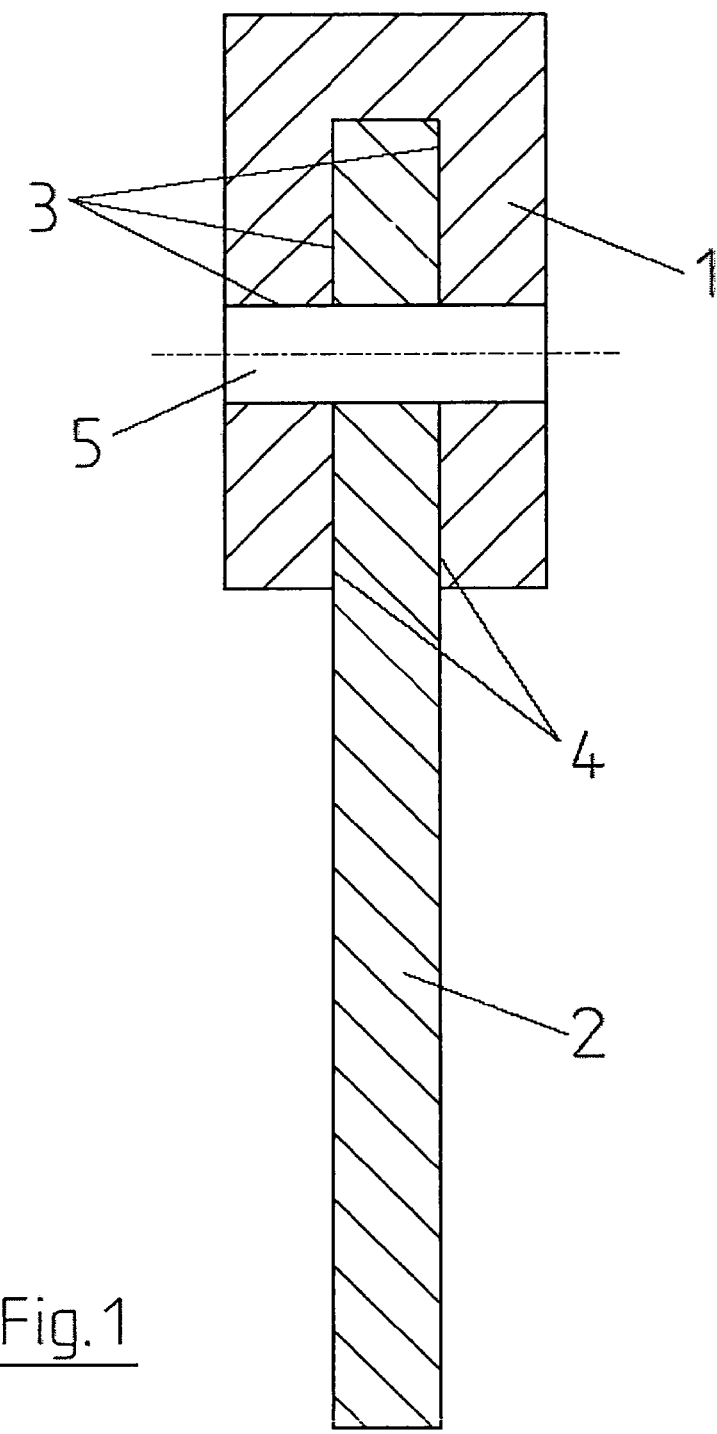
FIG. 1 shows a detailed view of a sliding rail mounted on a steel girder.

FIG. 1 illustrates an arrangement such as that used with previous tunnel freezers for freezing foodstuffs. A sliding rail 1 is pushed onto a steel girder 2. This results in gaps 3 and 4 between the sliding rail 1 and the steel girder 2, thus leading to hygiene problems when these are used in food technology. The sliding rail 1 is secured on the steel girder 2 by means of a bolt 5.

Figure 2:
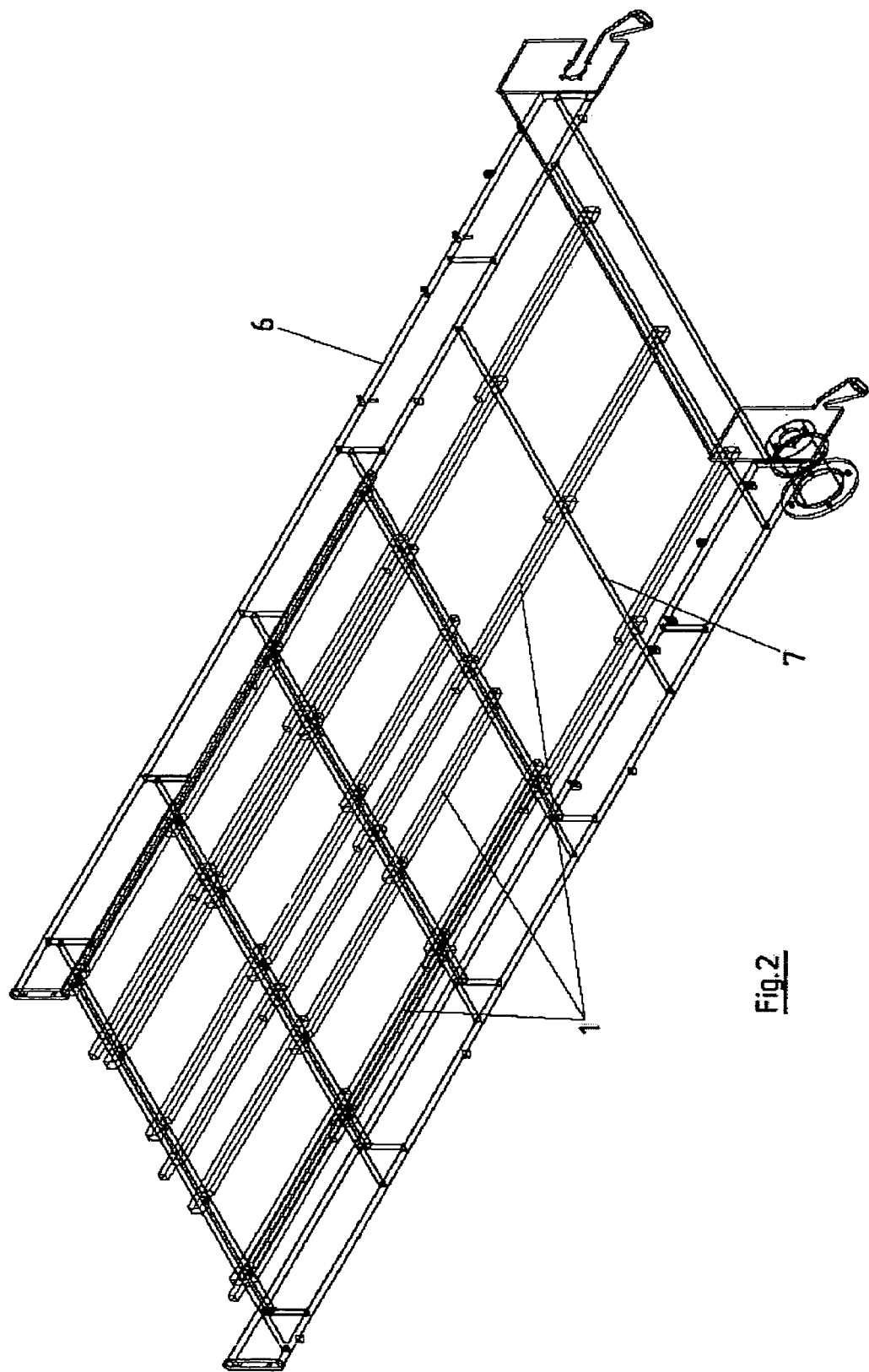
FIG. 2 shows a supporting frame equipped with sliding rails for a conveyor belt in accordance with an embodiment of the present invention.

FIG. 2 shows an overall supporting frame 6 as provided for a tunnel freezer according to this invention. The supporting frame 6 is usually made of metal and has transverse bars 7. Self-supporting sliding rails 1 are placed on the transverse bar 7. During operation of the tunnel freezer, the conveyor belt (not shown in the figure) is guided over the sliding rails 1.

The upper part of FIG. 3 shows a conveyor belt 8, which is guided on a sliding rail 1 in the direction indicated by the arrow 9. This sliding rail 1 is designed as a self-supporting plastic part, for example, which sits on transverse bars 7. For compensation of differences in thermal expansion, the sliding rails 1 are designed as fixed and movable bearing constructions, as depicted in the upper part of the figure. The lower part of FIG. 3 shows how the sliding rails 1 are mounted on the transverse bar 7. The sliding rails 1 have recesses for the transverse bars 7 and simply sit on the transverse bars 7. Nipples 10 are mounted on the transverse bars 7 to prevent lateral slippage of the sliding rails 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for treating foodstuffs, comprising a treatment zone in which a conveyor belt is situated for conveying the foodstuffs through the treatment zone, the conveyor belt being supported by a frame and sliding rails being mounted on the frame with the conveyor belt guided on them, wherein the sliding rails are self-supporting elements, the sliding rails are made entirely of a low-friction plastic and are mounted on the frame, the sliding rails, when in an installed position on the frame, are in a fixed and movable bearing construction which fixes at least a first end of the sliding rails in position relative to the frame while permitting at least a second end of the sliding rails to move relative to the frame to compensate for differences in thermal expansion, the sliding rails have a cross-section which is essentially rectangular with a rail height greater than a rail width, and the sliding rails are placed on fixed, non-rotatable transverse bars with only two points of contact with the transverse bars.

2. Device as claimed in claim 1, wherein the sliding rails are secured by nipples mounted on the transverse bars to prevent lateral slippage.

3. Device as claimed in claim 1, wherein the sliding rails are secured by spacers to prevent lateral slippage on the transverse bars.

4. Device as claimed in claim 1, wherein the treatment zone is a food freezer.

5. Device as claimed in claim 4, wherein the treatment zone is a tunnel freezer.

6. A device for treating products, comprising:

a conveyer for transport of a product; and a refrigeration unit which includes a treatment zone through which the conveyer passes, wherein the conveyer is guided on sliding rails supported by a supporting frame, the sliding rails are self-supporting, the sliding rails are made entirely of a low-friction plastic and are mounted on the frame, the sliding rails, when in an installed position on the frame, are in a fixed and movable bearing construction which fixes at least a first end of the sliding rails in position relative to the frame while permitting at least a second end of the sliding rails to move relative to the frame to compensate for differences in thermal expansion, the sliding rails have a cross-section which is essentially rectangular with a rail height greater than a rail width, and the sliding rails are placed on fixed, non-rotatable transverse bars with only two points of contact with the transverse bars.

* * * * *